E. H. THOMPSON & J. E. KAJUT.
CAPPING-OFF APPARATUS FOR GLASS CYLINDERS.
APPLICATION FILED JUNE 26, 1912.
1,143,242.
Patented June 15, 1915.
4 SHEETS—SHEET 1.
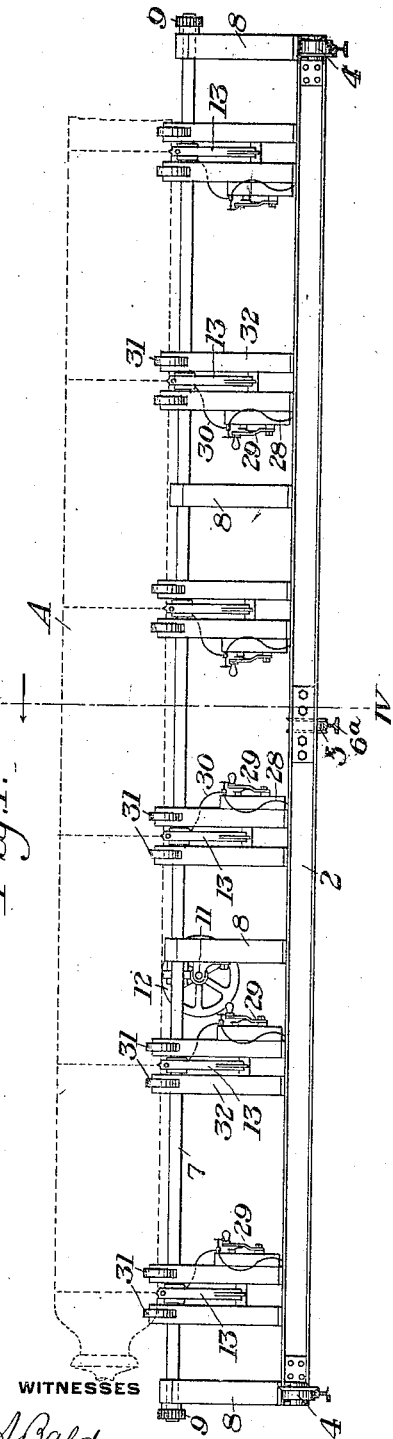
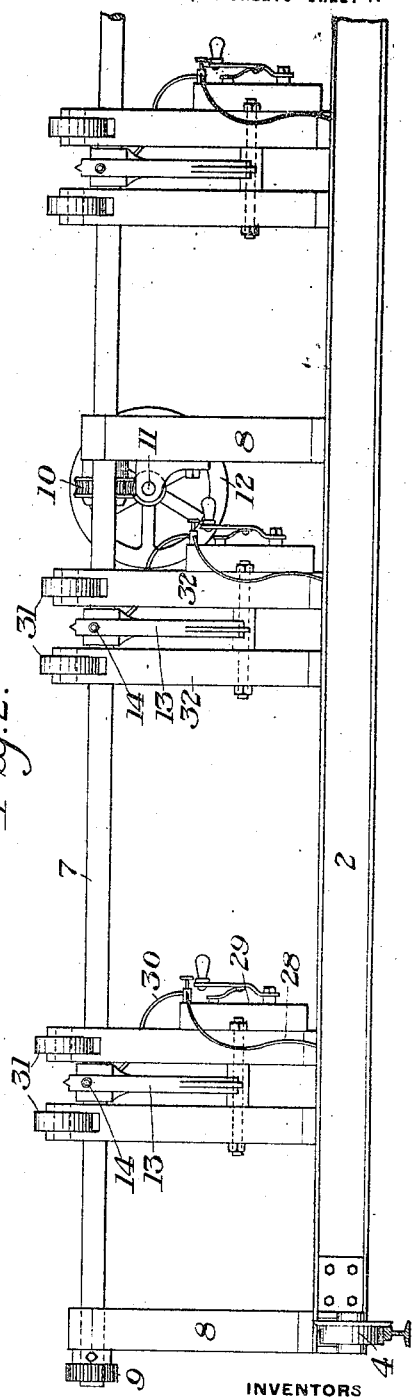

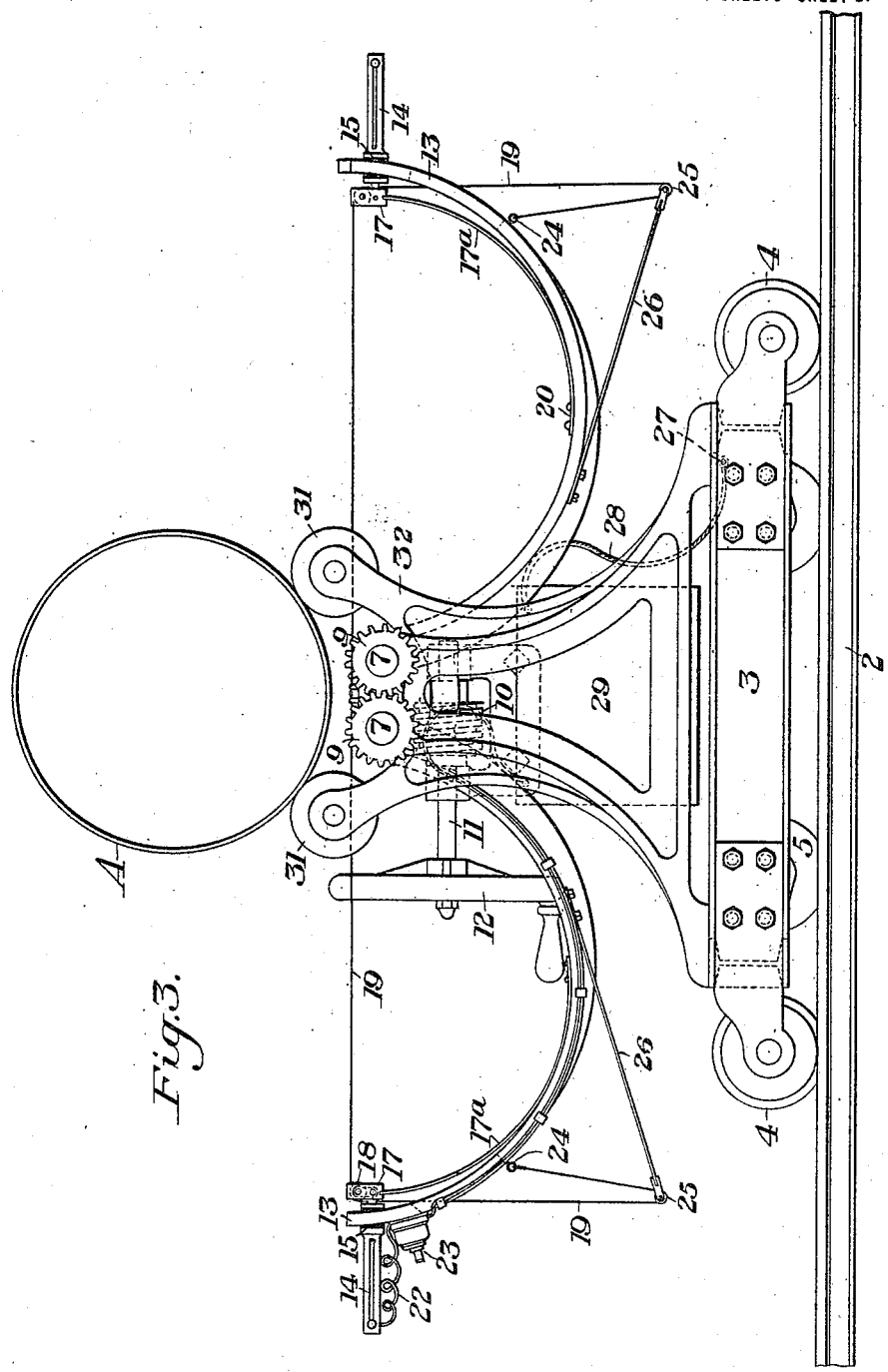

E. H. THOMPSON & J. E. KAJUT.
CAPPING-OFF APPARATUS FOR GLASS CYLINDERS.
APPLICATION FILED JUNE 26, 1912.
1,143,242.
Patented June 15, 1915.
4 SHEETS—SHEET 3.
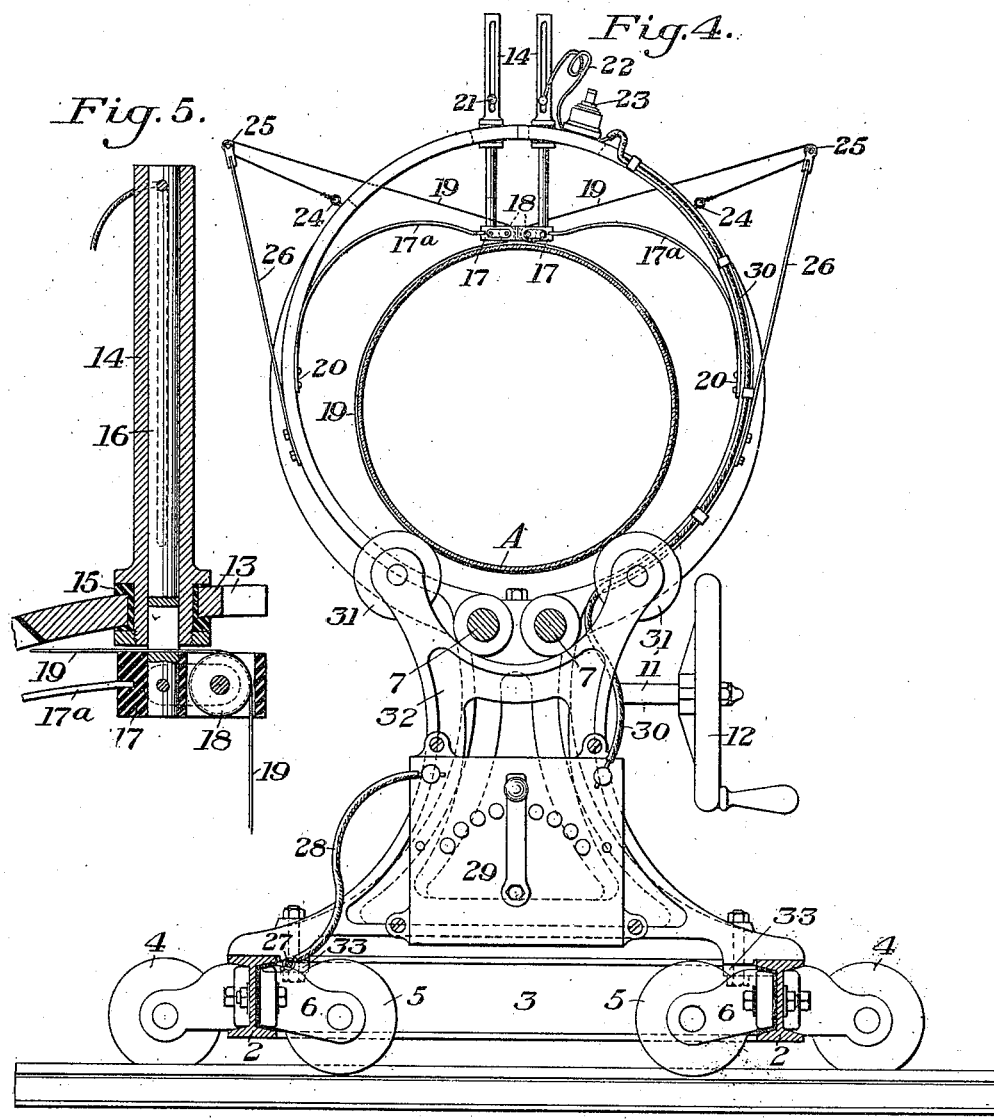
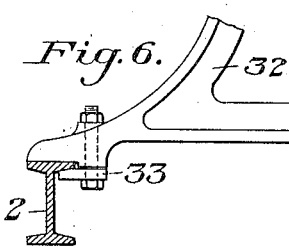
WITNESSES
INVENTORS

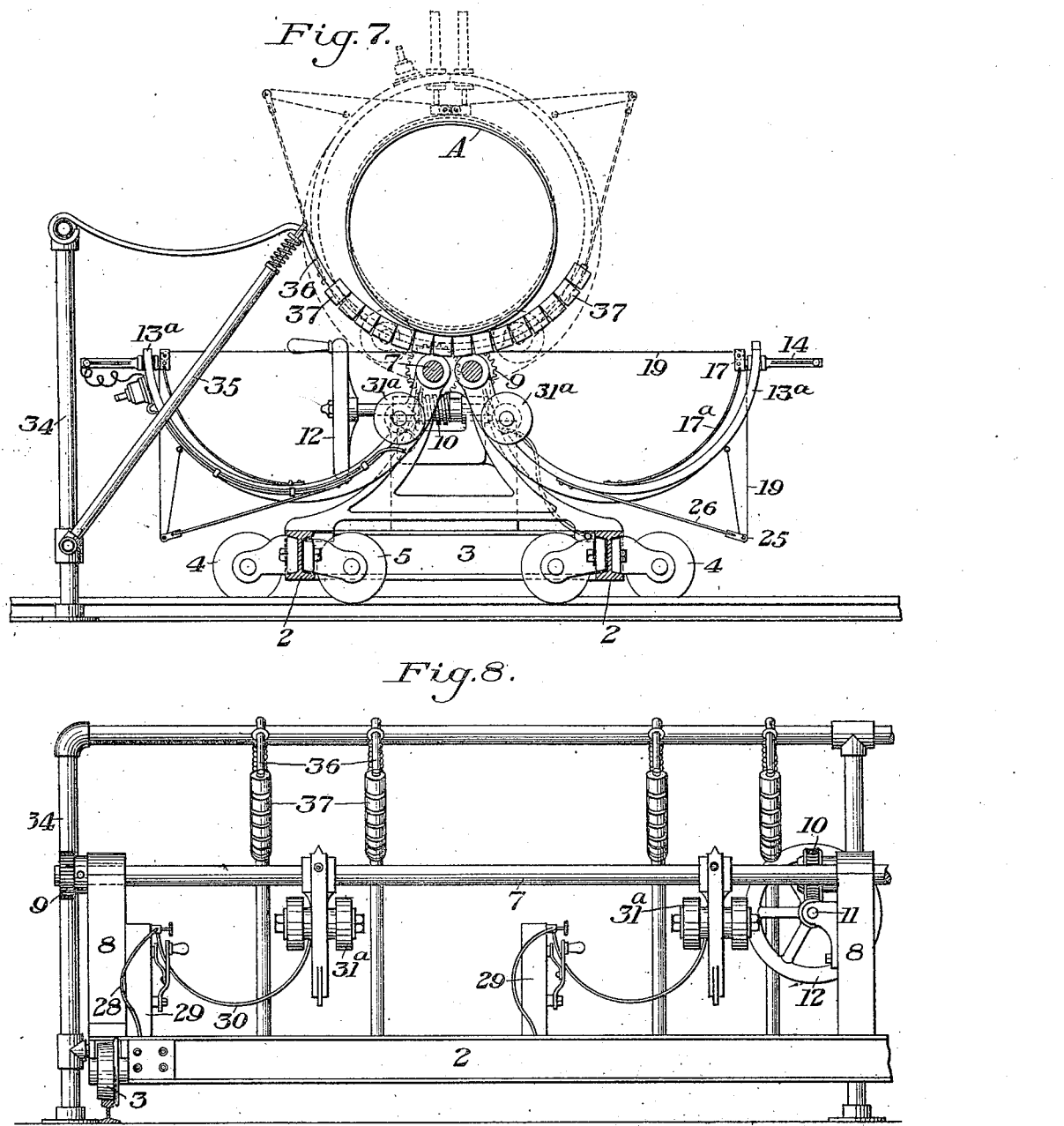

UNITED STATES PATENT OFFICE.

ENNIS H. THOMPSON AND JOSEPH E. KAJUT, OF ARNOLD, PENNSYLVANIA, ASSIGNORS TO WINDOW GLASS MACHINE COMPANY, OF PITTSBURGH, PENNSYLVANIA, A CORPORATION OF NEW JERSEY.

CAPPING-OFF APPARATUS FOR GLASS CYLINDERS.

1,143,242.   Specification of Letters Patent.   Patented June 15, 1915.

Application filed June 26, 1912. Serial No. 705,968.

*To all whom it may concern:*

Be it known that we, ENNIS H. THOMPSON and JOSEPH E. KAJUT, residents of Arnold, in the county of Westmoreland and State of Pennsylvania, have invented a new and useful Improvement in Capping-Off Apparatus for Glass Cylinders, of which the following is a full, clear, and exact description, reference being had to the accompanying drawings, forming part of this specification, in which—

Figure 1 is a side elevation showing one form of our invention; Fig. 2 is a partial side elevation on a larger scale; Fig. 3 is an end elevation of the same; Fig. 4 is a cross section on the line IV—IV of Fig. 1; Figs. 5 and 6 are detail views hereinafter referred to; Fig. 7 is an end elevation showing a modified form; and Fig. 8 is a partial side elevation of the form of Fig. 7.

Our invention relates to electrical crack-off apparatus for severing long cylinders into suitable lengths for opening and flattening.

The object of the invention is to provide simple and effective mechanism for this purpose which may be operated by unskilled labor, may be used on different sized cylinders, and will do away with the wrapping of the electric heating wires by hand and the need of rotating the cylinder or crack-off device.

In the drawings, referring to the forms of Figs. 1 to 6, inclusive, 2, 2 represent the longitudinal I-beams of a truck structure having transverse members 3, mounted on end wheels 4, 4 and intermediate wheels 5. The intermediate wheels are insulated from the beams by insulated brackets, shown at 6 in Fig. 4, and act to receive electric current from the third rail shown at 6$^a$; while the end wheels are grounded through their rails. This truck frame is provided with a pair of shafts 7, 7, extending within stationary bearings in standards 8 on the truck. These shafts have intermeshing pinions 9, 9 at their ends and one of them is provided with an intermediate worm wheel actuated by worm 10, on shaft 11, which may be rotated either by hand or by suitable motor or driving connections. In the form illustrated, we have shown a hand wheel 12 for this purpose. Secured to these shafts at suitable intervals apart are the arc-shaped or semicircular arms 13, arranged in pairs, one secured to each shaft. Rotation of the shafts will simultaneously swing these arms toward or from each other. Near the free end of each arm 13 is fixed an outwardly projecting tube 14, insulated from the arm, as shown at 15, and having a stem or rod 16 movable therein. To the lower end of this rod is fixed a carrier 17, preferably of insulating material, in which is pivoted a wheel 18 over which extends the electric heating wire 19. Each carrier 17 is supported upon a curved leaf spring 17$^a$, secured to the arm 13 at 20. This spring normally holds the parts in the position shown in Fig. 3. The guide tube 14 is slotted along one side and through this slot projects the pin 21, to which the conductor 22 is fixed, this conductor extending from snap switch 23 on the arm. One end of each wire 19 is secured to the arm at 24, the wire thence extending outwardly over a grooved wheel or pulley 25 on spring arm 26, and thence inwardly toward the end of the arm to the pulley 18, whence it extends across the apparatus to the similar wheel of the other arm, thence over this pulley 25 and to the fixed point 24.

The current enters through a main feed wire 27, from the intermediate wheels, and thence through branches 28 to rheostats 29, one for each electric heating wire. From this rheostat, the current passes through wire 30 along one of the swing arms to the snap switch 23 thereon, and thence to the sliding rod which conducts through the wheel supports and wheel 18 to the movable wire 19; thence through the wire to its other end; thence to the other sliding rod and back to ground.

When the shafts 7 are rotated toward each other, starting with the parts in the position of Fig. 3, the two portions of the wire will be wrapped around the glass cylinder shown at A, the parts then assuming the position shown in Fig. 4. During this action, the pull of the wire wrapping around the cylinder will draw down the rods or plungers within the tubes 14 against the action of the inner leaf springs, the parts then being ready for the cracking-off or capping operation.

The cylinder A is preferably carried on rollers 31, which are shown as mounted in sets of two pairs, one on each side of each pair of swinging arms. These pairs of rollers are shown as mounted in stationary frame supports 32. These frame supports are shown as adjustable along the I-beam to the trunk, being adjustably secured by clamps 33 (Fig. 6) and we have shown them as tied together on opposite sides of the central longitudinal axis of the machine.

In using the apparatus, the parts being in the position shown in Fig. 3, the cylinder is laid on the successive sets of rollers 31. The hand wheel 12 is then actuated to swing the arc-shaped arms upwardly and inwardly toward each other, thus wrapping the successive heat wires around the cylinder. The parts then assume the position shown in Fig. 4 and the operator or operators, through the rheostats and snap switches, can turn on the current simultaneously or successively for heating the different portions of the cylinder including the end or cap portion. The current may then be turned off, the rollers cracked apart in the usual way and the arms swung back to their original position. The apparatus may be moved on its supporting rails to the point desired for use and is self-contained.

In Figs. 7 and 8, we show another form of the invention which may be employed with a stationary horse or support for the cylinder. This form is similar to the form of Figs. 1 to 6, inclusive, except that the glass cylinder is supported independently of the crack-off apparatus, and the glass-supporting rollers on the crack-off machine are movable so as to lift the cylinder off from the horse and on to these rollers as the swing arms are swung up to their operating position. In this form, 34 indicates pipe standards having diagonals 35, through which extend the overhanging supports 36, covered with suitable sectional sleeves 37 of asbestos or other suitable material.

The cylinder A rests on the overhanging arms 36 at a suitable height, so that our cracking-off apparatus may be moved under it, as shown in Fig. 7. In this form, the supporting rollers 31ª are carried on the swinging arms 13ª. Consequently, as these arms move upwardly and inwardly toward each other, the wheels 31ª will strike the glass cylinder and lift it away from the horse. At the same time, the wires will be wrapped around the cylinder at the separated points, as in the first form, until the parts assume the position shown in dotted lines in Fig. 7. The operation is then carried out the same as before and thereafter the arms are swung down, thus allowing the cylinder to drop back on the overhanging supports of the stationary horse.

The advantages of our invention will be obvious to those skilled in the art, since the hand wrapping of the wires around the cylinder is obviated and the cracking-off operation quickly and easily carried out. Multiple cracking-off is provided for, and this either successively or simultaneously. The machine is adjustable for cutting different lengths of rollers and the wires will adjust themselves to the particular cylinder operated upon. As the wires are wrapped around the cylinder, we do not need to rotate the cylinder nor the carrier for the crack-off device.

We claim:

1. Capping-off apparatus, comprising a plurality of arms arranged in pairs and the pairs in longitudinal alinement, said arms being of curved form and pivotally supported at their lower ends, actuating means for said arms whereby those of each pair may be swung laterally toward and away from each other, together with cracking-off means carried by said arms and arranged to be brought into and out of contact with a glass cylinder embraced by said arms, substantially as described.

2. In apparatus of the character described, a plurality of pivoted arms arranged in pairs and carrying each a cracking-off wire, connections arranged to simultaneously move all of the arms to wrap the wires around the cylinder to be capped-off, and means for passing electric currents through the wires; substantially as described.

3. In apparatus of the character described, a supporting frame having supports for the cylinder to be operated upon, a plurality of pivoted arms arranged in pairs, each of the pairs carrying a cracking-off wire, means for simultaneously operating all of the arms to wrap the wires around the cylinder, and separate means for controlling the current in each of said wires; substantially as described.

4. In apparatus of the character described, a supporting frame for the cylinder to be operated upon, a plurality of pivoted arms arranged in pairs, a cracking-off wire carried by each pair of said arms, shafts to which the arms are connected, and means for actuating said shafts to thereby simultaneously move all the arms to wrap the wires around the cylinder; substantially as described.

5. In apparatus of the character described, a frame having supports for the cylinder to be operated upon, a plurality of movable arms having cracking-off means, and connections arranged to move the arms to bring the cracking-off means into operative relation with the cylinder, said arms also having means for engaging the cylinder to lift it from the supporting means on the frame and support it while so lifted; substantially as described.

6. Capping-off apparatus, comprising a plurality of arms arranged in pairs and the pairs in longitudinal alinement, said arms being of curved form and pivotally supported at their lower ends, actuating means for said arms whereby those of each pair may be swung laterally toward and away from each other, together with cracking-off means carried by said arms and arranged to be brought into and out of contact with a glass cylinder embraced by said arms, the arms also having supporting means for the cylinder, substantially as described.

In testimony whereof, we have hereunto set our hands.

ENNIS H. THOMPSON.
JOSEPH E. KAJUT.

Witnesses:
M. H. MAINWARING,
CHAS. A. JAY.